United States Patent [19]

St. Denis

[11] 4,335,439
[45] Jun. 15, 1982

[54] WEIGHT MONITORING DEVICE FOR STRIP METAL STOCK

[76] Inventor: Andrew R. St. Denis, 3541 Rankin Ave., Windsor, Ontario, Canada

[21] Appl. No.: 143,729

[22] Filed: Apr. 25, 1980

[51] Int. Cl.³ ............................................. G06F 15/46
[52] U.S. Cl. ...................................... 364/562; 364/472
[58] Field of Search .............. 364/562, 563, 567, 472, 364/558

[56] References Cited

U.S. PATENT DOCUMENTS

| | | | |
|---|---|---|---|
| 3,676,652 | 7/1972 | Millis, Jr. et al. | 364/562 |
| 3,710,084 | 1/1973 | Slagley et al. | 364/562 |
| 4,102,190 | 7/1978 | Fradeneck et al. | 364/472 X |
| 4,106,318 | 8/1978 | Yanagimoto et al. | 364/472 |
| 4,136,396 | 1/1979 | Hansford | 364/472 X |
| 4,159,572 | 7/1979 | Nunes | 364/563 X |
| 4,220,025 | 9/1980 | Baba et al. | 364/472 X |

FOREIGN PATENT DOCUMENTS 595741 2/1978 U.S.S.R. .............................. 364/472

*Primary Examiner*—Edward J. Wise

[57] ABSTRACT

A system is described for automatically monitoring lengths and thicknesses of strip metal stock being fed to a metal processing machine, e.g. a power press. The system comprises:

(a) measuring wheel and transducer adapted to generate electrical signals proportional to the actual length of advancement of the stock, (b) a linear vertical differential transformer probe adapted to generate electrical signals proportional to the actual thickness of the strip stock fed, and (c) a programmable memory bank adapted to count electric pulses received from said length measuring means thereby measuring the length of feed stock actually fed, to convert electric pulses received from said thickness measuring means to measurements of the thickness of feedstock actually fed and also being adapted to store data based on the predetermined width and density of the stock and determine the weight of stock fed as computed from the width and density data stored and the determined length and thickness of the actual stock fed.

10 Claims, 4 Drawing Figures

WEIGHT MONITORING DEVICE FOR STRIP METAL STOCK

BACKGROUND OF THE INVENTION

1. Field of the Invention

This invention relates to a device for automatically monitoring lengths and thicknesses of strip metal stock being fed to a metal processing machine, e.g. a power press.

2. Description of the Prior Art

A typical power press comprises a frame structure which provides a feed path for the stock between relatively movable tool-carrying members. One of the tool-carrying members is normally a ram movable rectilinearly along a guide path in a direction toward and away from the other tool-carrying members forming a bed or table on the frame structure. The driving means for the ram comprises a fly-wheel or other rotary power storage member operatively connected through a clutch with an eccentric element such as a crank, cam or eccentric serving to impart the required movement to the ram.

In the power presses, it is necessary that feed movement of the stock should be coordinated with the relative movement of the tool-carrying members so that the portion of the stock disposed at a working station between the tool-carrying members is stationary while it is engaged by and deformed or otherwise acted upon by the tools carried by the tool-carrying members. It is subjected to the necessary feed movement at such times as the tool carrying members are separated from each other by a distance sufficient to permit movement of the stock.

For efficient utilization of the stock, i.e., formation from the stock of the maximum number of work pieces, it is required that the product-forming portions of the stock should be placed as close to each other as possible. On the other hand, there are a number of variable factors such as the surface condition of the stock, surface condition of the components of the feeding device which engage with the stock to impart the necessary movement thereto and the thickness of the stock and its mechanical properties, any of which may contribute to some variation either in a random or systematic manner in the magnitude of the actual feed step imparted to the stock. These make it necessary to allow for such variation in determining the nominal value of the feed step imparted to, and hence the nominal separation between product-forming portions of the stock.

Moreover, it is often required that a particular power press shall be operated for relatively short runs of perhaps a few days or even a few hours, to produce certain products involving the application to the stock of feed movements of a certain magnitude and thereafter may be applied to the production of other products, from the same or different stock, involving feed movements of different magnitude.

The problems of controlling in an accurate manner the feeding of the stock to a power press have been largely overcome by the control unit described in U.S. Pat. No. 3,716,773 and the hydraulically powered feeder described in U.S. Pat. No. 3,771,703. However, there still remains a serious problem facing sheet metal processers today and that is the cost of the metal. This metal is typically purchased by the processer in the form of very large coils or rolls and the cost of this metal is based upon its weight. For many industries, such as the automotive industries, the metal parts formed must meet certain minimum government standards as to metal thickness or gauge. The manufacturer who produces the metal coils or rolls may encounter some difficulty in uniformity of gauge and, to be certain that all of a roll is at the minimum required gauge, he will manufacture the strip metal at a nominal gauge somewhat thicker than the required minimum. This, of course, does not hurt the metal manufacturer since he sells on the basis of weight of metal, but it does impose an additional burden on the metal processor.

Thus, the metal processor will purchase a coil of strip metal and, on the basis of its nominal thickness, he expects it to have a certain total length which will provide him with a certain number of work pieces. However, since the coils which he purchases are frequently thicker than the nominal stated thickness, the metal processor finds that the coil which he has purchased produces fewer than the expected number of work pieces. It is, of course, most difficult at this stage to prove to the metal manufacturer that the deficiency in the total number of expected work pieces was caused by the nature of the strip metal received and not by wastage on the part of the metal processor.

There is, therefore, a great need in the industry for a system which will monitor the length and thickness and determine the weight of strip metal being fed through a power press. Accordingly, it is the object of the present invention to provide a system which will give a measurement of the weight of the metal actually fed through a power press, which measurement will be acceptable both to the metal processor and the manufacturer of the coils of strip metal.

SUMMARY OF THE INVENTION

Thus, in accordance with the present invention there is provided a device for automatically monitoring lengths and thicknesses of strip metal stock being fed to a metal processing machine. In its broadest aspect the device comprises measuring means adapted to generate electrical signals proportional to the actual length of advancement of the stock, measuring means adapted to generate electrical signals proportional to the actual thickness of the strip stock fed, and computing means adapted to count electric pulses received from said length measuring means thereby measuring the length of feed stock actually fed, to convert electric pulses received from said thickness measuring means to measurements of the thickness of feedstock actually fed and also being adapted to store data based on the predetermined width and density of the stock and determine the weight of stock fed as computed from the width and density data stored and the determined length and thickness of the actual stock fed.

The length and thickness can conveniently be monitored by means of a pair of wheels or rollers for engaging therebetween the strip metal stock. The rollers are mounted on articulated supports to move generally perpendicular to the direction of travel of the strip stock and are biased into engagement with the opposite faces of the strip stock.

One of the rollers has a transducer connected thereto to generate electrical signals proportional to the actual advancement of the strip stock and these signals are fed to a computing means for determining the length of strip stock actually fed. A linear vertical differential transformer (L.V.D.T.) probe is connected between said articulated supports to generate electrical signals proportional to the distance between the rollers and thus the thickness of the strip stock passing between the rollers and these signals are also fed to the computing means. This computing means is also adapted to store data based on the predetermined width and density of the stock and determine the weight of stock fed as computed from the width and density data stored and the measured length and thickness of the actual strip stock fed.

The information on the width and density of the stock is available from the metal manufacturer and by combining this with an accurate measurement of the length and thickness of stock actually fed, a calculated weight of stock can be made. This calculated weight is then accepted by the metal manufacturer since it will produce the number of work pieces that was expected by the metal processor on the basis of the stated nominal thickness of the metal stock which he had purchased.

DESCRIPTION OF THE PREFERRED EMBODIMENTS

The length measuring means is preferably a low inertia light roller maintained in contact with the strip metal stock so as to have negligible slip relative thereto and directly mechanically connected with an electrical signal generator, such as a rotary pulse generator. The thickness measuring means is, as stated above, a linear vertical differential transformer probe (L.V.D.T.), which produces signals proportional to the space between the rollers and thus the thickness of the strip stock. The electrical signals from the pulse generator and LVDT probe are fed to an analog or a digital computing device. This computing device is programmed to store data based on the predetermined width and density of the metal stock and is also programmed to determine the weight of the stock fed as computed from the width and density data stored and the measured length and thickness of the actual metal stock fed.

Preferably, the system consists of a series of satellite monitors installed close to each press feeder being monitored and a central processor-printer which is installed in a production office. The satellite monitor serves as the operator's entry tool for information about a new coil obtained from the coil tag. The information received and computed for the previous coil is transmitted from the monitor to the central printer at the beginning of each new coil. The satellite monitor also serves as a visual read-out and automatic shutdown for fault conditions.

The central processor-printer is a programmable memory bank which can accumulate and process data from up to 20 satellite monitors and print-out all data accumulated by the processor.

Each satellite monitor typically includes a microcomputer, a 16 character alphanumeric display, a 24 key keyboard and thumbwheel switches. It may also include indicator lights to indicate such conditions as a coil of strip metal in place, metal thickness above or below an acceptable range, memory full, etc, as well as a keylock switch and a restart button. Each satellite monitor is provided with a non-volatile memory that can hold at least two days of operation data in the event of a breakdown in the central processor. The satellite monitor must, of course, also be connected for two-way communication capabilities with the central processor.

The printer is capable of providing print-outs which typically include the part number, the coil number, the total length of strip metal fed, the length of scrap, the total number of strokes or hits, the high and low limits of thickness and all the points which were under or over the thickness limits for the coil used. It also gives a calculated weight of strip metal fed, a mill weight for the coil and width of coil.

Certain preferred embodiments of the invention will now be described by way of example with reference to the accompanying drawings in which:

FIG. 3 is a schematic illustration of the face of a satellite monitor.

Figures 1, 4:
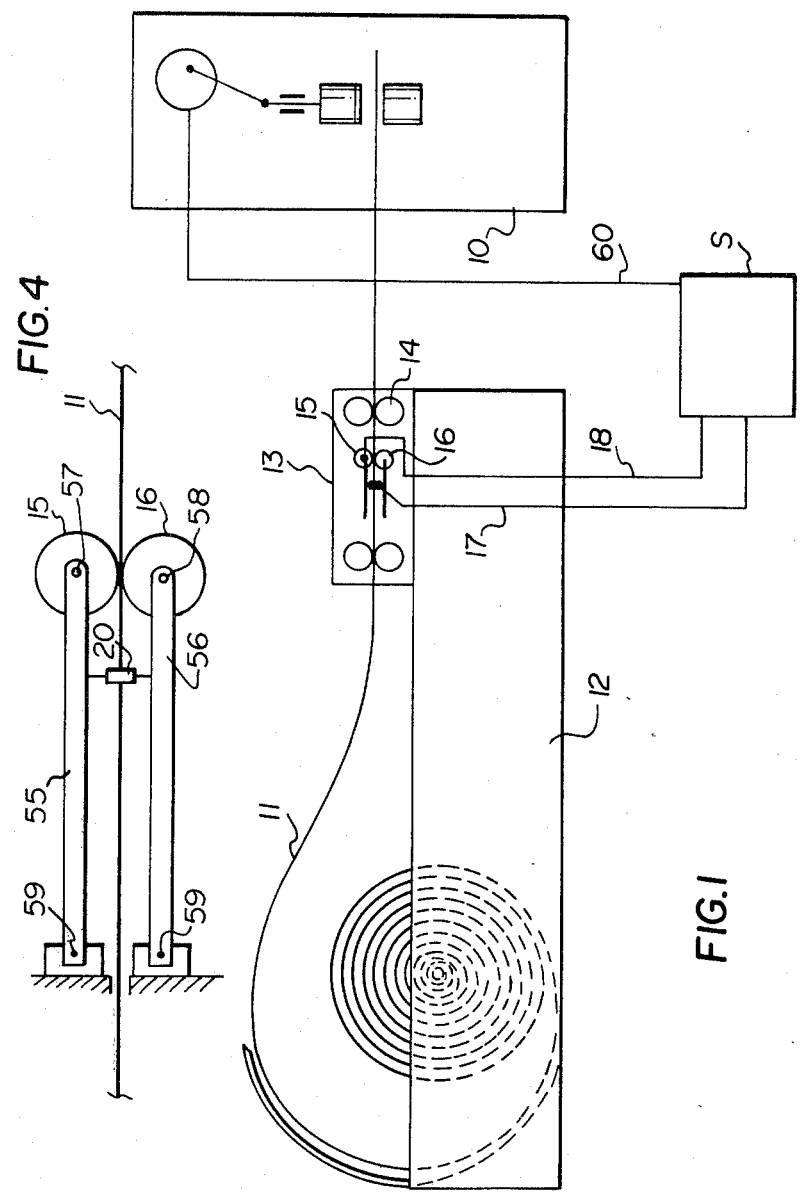
FIG. 1 is a schematic drawing of a feeder and press installation.
FIG. 4 is a side elevation showing the measuring roller and LVDT.

Referring now to the drawings, a power press indicated generally at 10 comprises any suitable frame structure which may be of conventional form and in which is mounted a reciprocating ram driven from a crank or other eccentric element from a power storage member, such as a fly-wheel.

Strip metal stock may be provided in the form of bulk supply such as a coil 11 mounted in any suitable cradle 12. This stock is fed to the press by means of feeder unit 13 which is of the general type described in U.S. Pat. No. 3,771,703 with rollers 14 powered by hydraulic motors (not illustrated). The feeder 13 includes a pair of rollers 15 and 16 mounted by rotatable shafts 57 and 58 on pivotal arms 55 and 56 and biased into engagement with the top and bottom faces of the strip metal stock 11. The arms can move on pivots 59 such that both rollers 15 and 16 will respond simultaneously to any vertical movement of the strip metal stock 11 and the actual vertical spacing between the rollers 15, 16 will change only in response to a variation in the thickness of metal. The shaft 57 of roller 15 is directly connected to a roto-pulser unit 19 and an LVDT probe 20, e.g. a Schaevitz LVDT is mounted between the pivotal arms.

Figure 2:
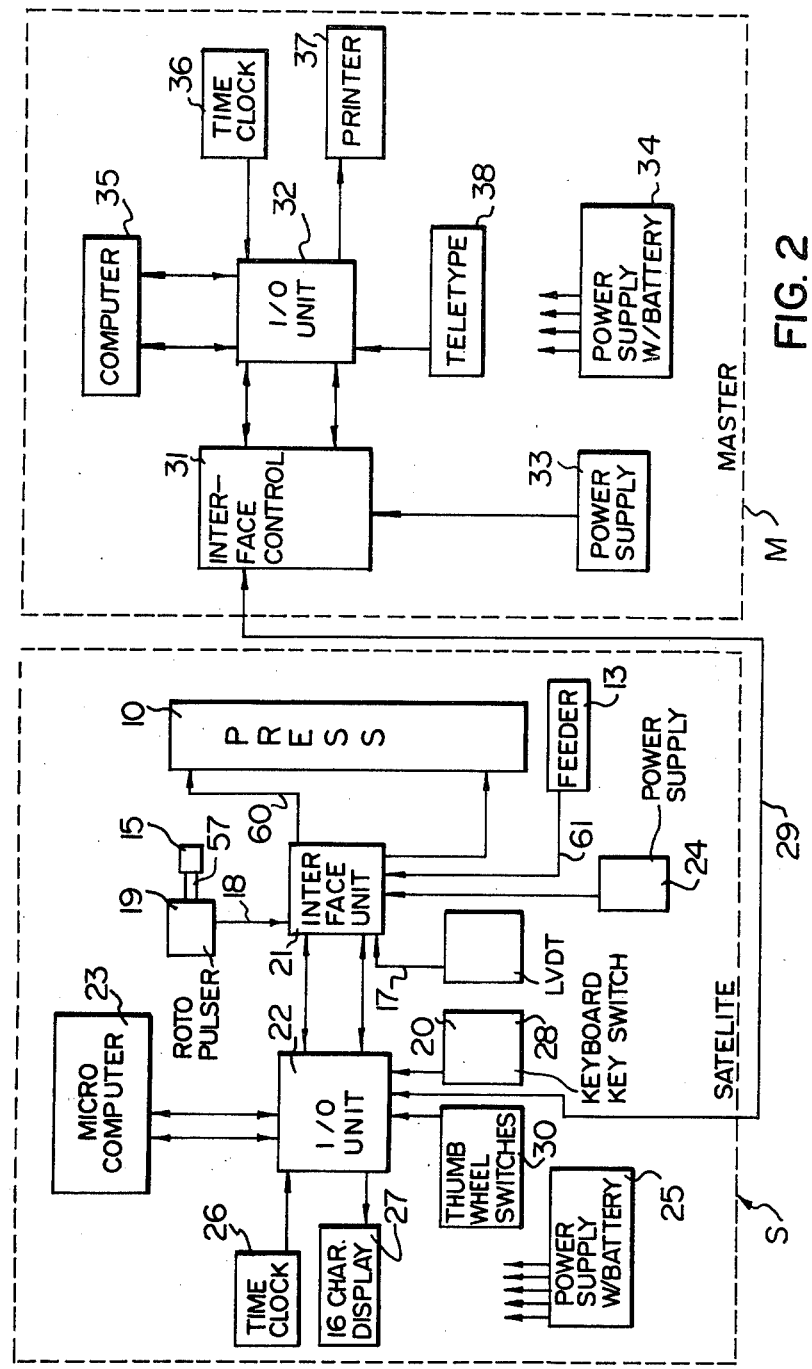
FIG. 2 is a schematic illustration of one embodiment of the control system of the invention.

Details of the monitoring system are shown in FIG. 2 and this may include a central processing station M to which is connected a series of satellite monitoring station S. Thus, a large plant may include a large number of press stations, e.g. up to 20 or more, and each press station includes a satellite S, with each satellite being connected to the master printing station M by means of a conduit 29.

In each satellite unit S there is an interface unit 21 for receiving and transmitting information from roto-pulser 19 via line 18, LVDT probe 20 via line 17, press 10 via line 60 and feeder 13 via line 61. The system is powered by power supply 24.

The interface unit 21 is connected to an input-output unit 22 and thence to a microcomputer 23. The input-output unit 22 also connects to a time clock 26, a 16 character alpha numeric display 27, a keyboard 28 and thumbwheel switches 30, as well as to central or master processor M by way of conduit 29. An auxiliary battery power supply 25 is also provided.

The usual hardware for each satellite is as follows:
CPU Card
  6800 CPU
  8K Eprom
  2 Pia's (Periferal Interface Adapter)
  2 Acia's (Asynchronous Communications Interface Adapter)
Ram Card (battery backed)

8K Static Ram
Differential communications line for party-line with master power up/down circuitry for battery backup
Utility Card
LVDT support circuit
3 4-digit thumbwheel (encoder calibration, brake length, and press ID)
Keyboard encoder
2 phase shaft encoder interface
Lamp drivers
24 key keyboard
16 character alpha-numeric display
8 indicator lights
3 digital inputs (key lock switch, scrap, hits)
3 digital ouputs (okay-to-run, brake adjustment, steel present solid state relay)
Shaft encoder or rotopulser (quadrature)
LVDT probe
Power supply
Housing
Cables
   Communications (dual twisted pair with shield supplied by user)
   LVDT connection
   Shaft encoder connection
   Machine control wiring for scrap and hit signals.

The central or master processor has similar computing and memory capabilities to the satellites, as well as a teletype operator terminal and a printer. The central processor M, as seen from FIG. 2, has an interface control 31 for differential communications with a series of 20 or more satellites S. It has a main power supply 33 and also a back-up battery 34, with suitable power up/down circuitry.

The interface 31 is connected to an input-output unit 32 and thence to a microcomputer 35. This input-output unit 32 also connects to a time clock 36, a printer 37 and an operator terminal 38.

The usual hardware for the central processor-printer is as follows:
CPU Card
  6800 CPU
  8K Eprom
  2 Pia's
  2 Acia's (RS-232 to operator terminal and production monitor printer)
Ram card (battery backed)
  8K static ram
  Differential communications line for party-line with satellites
  Power up/down circuitry for battery backup
  Read time clock
  Watchdog and system fault indicator driver
Teletype model 43 (operator terminal)
Production monitor printer (RS-232)
Power supply
Housing
Cables
   Operator Terminal (25 ft RS-232)
   Production monitor printer (RS-232.

Figure 3:
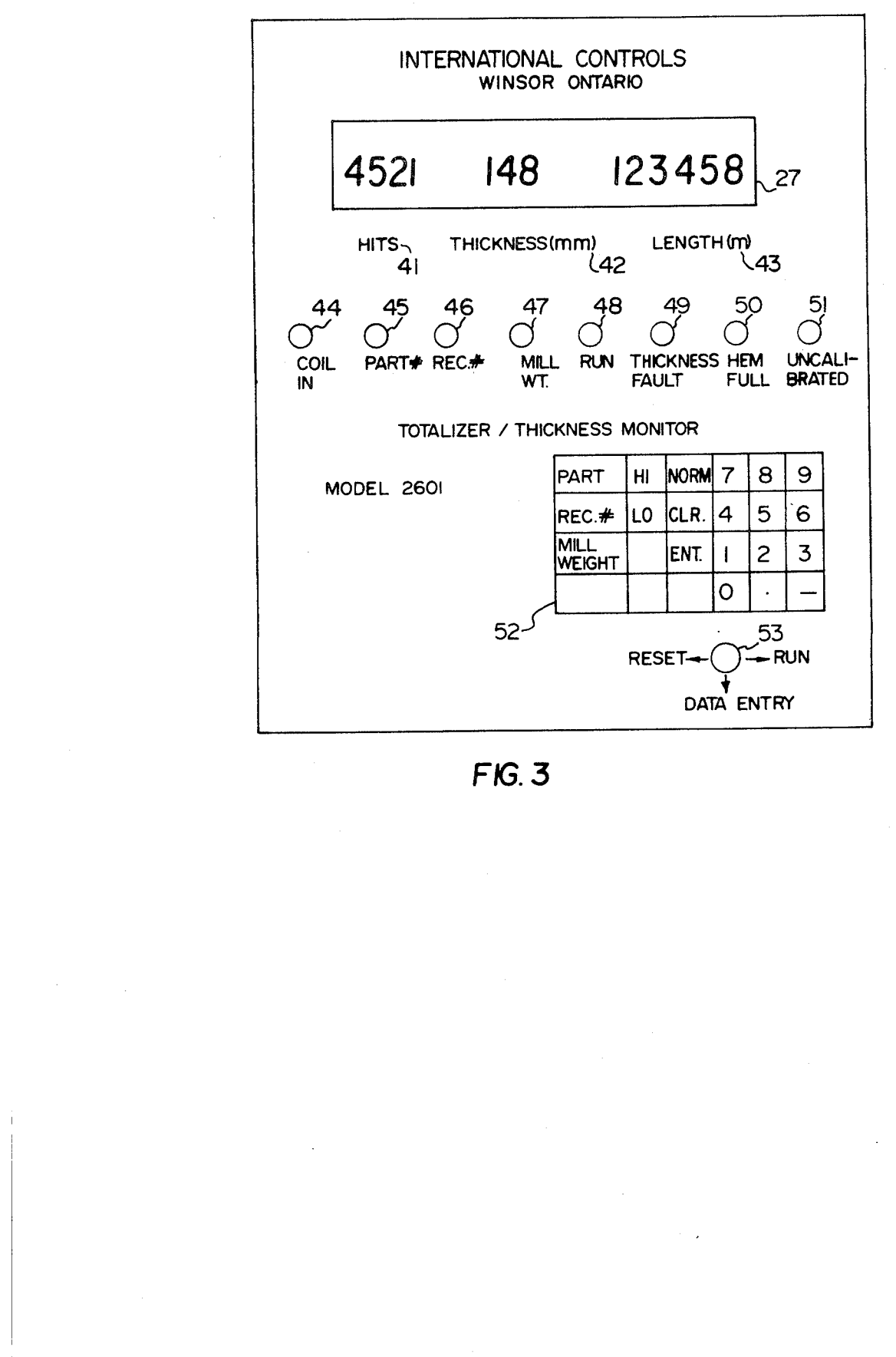

A typical satellite monitoring unit face is shown in FIG. 3 and this includes the 16 character alpha numerical display 27 as mentioned above. In normal operation the display 27 displays the number of hits or strokes 41, the thickness of the strip metal 42 and the length of the material advanced 43. It may also display a number of other items as will be discussed hereinafter.

The monitor face also includes a number of indicator lights which light up under certain conditions. These include a "Coil In" light 44, a "Part #" light 45, a "REC. #" light 46, a "Mill Weight" light 47, a "Run" light 48, a "Thickness Fault" light 49, a "Memory Full" light 50 and an "Uncalibrated" light 51.

The keyboard 52 includes the numbers from 0 to 9 as well as a series of special function keys indicated as PART #, REC.#, MILL WEIGHT, HI, LO, NORM, CLR. and ENT. Also included is a key lock switch 53 positional between "RUN", "DATA ENTRY" and "RESET".

The computer is in part permanently programmed by the manufacturer and in part programmed by information fed in on the particular operation to be run. The portion of the progrm fixed permanently by the manufacturer includes such items as sequence of printed data and automatic printout at the end of each coil of metal. For operations over an extended period of time, such as a year, a particular press will normally repeat only a limited number of operations and these can be programmed into the machine with a programming number as the part number "PART #". For instance, a typical device will be programmed to run a series of different jobs and for these individual jobs the programmed information will include the width, thickness and density of the metal. The following set-up data is stored for each of up to 200 coil types:
The coil type identifier of up to 9 digits (PART #).
The high limit on the thickness in millimeters (HI).
The lower limit on the thickness in millimeters (LO).
The width of the coil in millimeters (WIDTH).
The specific gravity in kilograms/cubic meter (SP.GR.).

The following data is gathered, recorded, and transmitted for each coil:
The press number (a 4 digit number read from thumbwheel switches).
The time and data of the report.
The PART # entered by the operator.
The width obtained from stored data.
The receiving report number entered by the operator from the coil tag (up to nine characters consisting of the digits 0–9, decimal point, and dash)
The mill weight in kilograms entered by operator (MILL WT)
The calculated weight in kilograms obtained from the measured length and the stored specific gravity (CAL WT)
The high limit in millimeters (HI).
The low limit in millimeters (LO)
The measured length of the coil in meters (LENGTH).
The measured length of scrap in meters (SCRAP).
The hits of the press (HITS).
The measured thicknesses and lengths associated with each thickness—the length of steel at each thickness (0.1 millimeter increments) will be maintained. The total number of thickness/length pairs stored may not exceed 500. The number of pairs per coil is variable.

The following limits typically apply to the numeric quantities above:
0.00=LO=HI=9.99 millimeters
LENGTH=65535 meters
HITS=65535 counts
SCRAP=65535 meters
WIDTH=65535 millimeters MILL WT.=65535 kilograms
CAL. WT.=65535 kilograms
SP. GR.=655.35 kilograms/cubic meter The scrap represents portions of the coil that cannot be used. For instance, the outer layer of a new coil is dirty and, if passed through a press, can cause problems. Accordingly, a predetermined length of the coil is normally cut off at the start of each new coil. Also, there may be some waste at the end of each coil represented by the tail end portion which tends to curl and interfere with the press.

The master processor transmits set-up data to each satellite when power is turned on, when the data is changed at the master processor and on demand from a satellite. Permanent changes to the set-up data can only be made at the master processor.

On initial power-up, the LVDT and the roto pulser for measuring length must be calibrated. The necessity for performing this function is indicated by the presence of the "Uncalibrated" light 51 on the display panel. As a result of the calibration procedure, the "Original 0" is determined for the LVDT. On subsequent power-ups and whenever "No Steel" conditions occur, the satellite will establish 0 by defining 0 to be the current thickness. This "Established Zero" must be within 0.25 millimeters of "Original Zero". If it is not, the "Uncalibrated" light comes on and "Please Calibrate" is displayed if the system has been on for more than 15 minutes. Otherwise, only the message "Warming" is displayed. The "Run" light will not come on until either zero can be established within the proper limits or the uncalibrated condition is "Approved" by the supervisor turning the key 53 to "Reset".

The "No Steel" condition is assumed whenever the measured thickness is within 0.25 millimeters of the "Established Zero".

On power up, the satellite runs a memory check to see if memory has been properly maintained by the battery. If memory passes the test, "Warming" is displayed and a 15 minute delay is initiated. If memory does not pass the test, it is cleared and a request is sent to the central processor to transmit all set up data for the coils. The "Uncalibrated" light will turn on and "Please Calibrate" will be displayed. At this point the LVDT must be calibrated or the supervisor can approve the uncalibrated operation by turning the key 53 to "Reset".

After the 15 minute delay, the zero reference will be established if possible. If the zero reference is established, the "Run" light will come on and the normal display will appear. If the zero reference cannot be established, the uncalibrated operation described above will occur.

At the start of each operation, the operator must feed certain data to the satellite. The operator interaction with the satellite takes place via a 24 key keyboard, a 16 character alphanumeric display and 4-digit thumbwheel switches. The basic allowed functions are:

1. Keyboard entry of PART # when a new coil enters rolls.
2. Keyboard entry of REC # for new coil on rolls.
3. Keyboard entry of mill weight (MILL WT) of new coil.
4. Keyboard modification of the LO and HI limits for the coil currently on the rolls (this is a privileged function activated by lock switch).
5. Thumbwheel switch entry of the press number.
6. Thumbwheel switch entry of the encoder pulse to distance conversion value.
7. Thumbwheel switch entry of the brake distance.

There are two modes of number entry at the satellite via the keyboard. The first mode is referred to as "Run mode" and the second is referred to as "Supervisor mode". In the "Run mode" the display prompts the operator for input by displaying a message signifying the data to be entered. The operator then enters the required number using the digit keys, the "CLR" key and the "ENT" key. The "CLR" key allows the correction of an error prior to depression of the "ENT" key. The "ENT" key causes the number in the display to be stored as the new value of the designated quantity. Once a number has been entered, it can be changed only as the result of another request via the display (when a new coil is detected) or as a result of entry under "Supervisor mode".

In normal operation, when a new coil is detected by the system, the "COIL IN" light comes on and the "PART #" appears in the display. At that point the operator must enter the coil identification number by pressing the correct sequence of digits followed by the "ENT" key. The number then appears in the display as it has been entered for checking. If an error has been made, the "CLR" key will allow for the re-entry of the number. The "ENT" key is pressed only after assuring the correctness of the displayed number. The satellite then compares the entered number to the stored identification numbers and, if a match is found, will continue to the next step. If a match is not found, "WRONG NUMBER" will be displayed for two seconds, followed by "PART #" again.

After the "PART #" is entered, the "PART #" light will come on and "REC #" appears in the display. At this time the operator must enter the sequence of vendor code and receiving report number, again using the "CLR" key to correct errors and the "ENT" key to enter the data. The computer cannot check this number for validity, but will simply accept any combination of up to nine characters composed of the digit keys, ".", and "—".

After the "REC #" is entered, the "REC #" light comes on and "MILL WT" appears in the display. As before, the operator must now enter the 5-digit mill weight taken from the coil tag. Once this has been entered, the "MILL WT" and "RUN" lights come on, indicating that the system is now prepared to run automatically. The display will now be in its "Normal" state, displaying the hits, thickness and length related to the coil on the rolls.

If the operator wishes to review the entered data at any point, he may press the appropriate key, i.e. "PART #", "REC", "MILL WT", "LO", or "HI". To return to the normal display, he simply presses "ENT". If, while reviewing the data, an error is observed in any of these, the supervisor with access to the key for the lockswitch 53 must be called to enable the "Supervisor Mode". In this mode the data may be modified by pressing the appropriate data key followed by the new value and "ENT". If after beginning to change a value it is determined that the change should not be made, the operation may be aborted by turning the key to the "RUN MODE" position or by using the "CLR" key and re-entering the original value. It should be noted that if the "HI" or "LO" limit values are changed, a message and the new values will be transmitted to the central processor.

The master processor provides overall system supervision. It prints all reports, handles all set up data entry and modification, handles any cassette recorder used for mass off-line storage, and provides the satellite units with the necessary data for operation.

Under normal conditions the master processor will periodically poll all the satellite processors, requesting end of coil reports, fault reports, and general status reports. When an end of coil report is received, it will be printed on both the operator's terminal and the production printer. Fault reports and general status reports will be printed only on the production printer. These fault/status reports include information about HI/LO limit changes, out of tolerances conditions, etc.

If the master has been off-line or otherwise out of service for a time, all stored reports from the satellites will be printed sequentially when the master comes back on line. If the master has been out of service for an abnormally long time, the satellites may have not been able to store all the data that would normally have been transmitted to the master. If this "MEMORY FULL" condition occurred, the satellite will transmit the data that was stored and inform the master that some additional data was lost because of lack of space in which to store it.

On power up of the master or central processor, the operator will be asked to enter the time and date. Once the time and data are established, the master then runs a memory check to see if valid data is stored for coil types. If the memory check fails, the operator will be advised that the coil data must be entered. The operator may then enter that data using one of the three functions defined in "OPERATOR INTERACTION". Only after valid data is available will the master transmit that data to the satellite units and begin the reporting process.

The operator interaction at the master processor takes place via a Teletype Model 43. The Model 43 has a full ASCII keyboard and a 132 column printer. Using this keyboard, the operator performs the following functions:

0. List of functions.
1. Modify Time/Date
2. Add coil set up data
3. Modify coil set up data
4. Report coil set up data (individual)
5. Report coil set up data (all)
6. Load data from satellite.

A sample print-out of a typical operator session is shown in Table 1. The prompt character for command entry is ">". The prompt character for data entry is "?". All command/data entry is terminated by a carriage return. In general, if a default value exists for a data value that is to be modified, that default value will be printed, followed by "?". To accept the default value as the current value, it is simply a matter of typing a carriage return.

Function 0 is executed whenever an invalid command is entered, thus enabling anyone to get the main menu by typing any nonsense character. Function 1 is used to set the time and date for the system clock and also to check that the time is correct. Functions 2 to 5 deal with the coil set up data described above. These functions allow the operator to set up new data, change current data, print current data for individual coil type or print current data for all coil types. Function 6 provides the capability to retrieve the set up data from the satellite units in the unlikely event that the master data is lost and the backup data on a cassette unit is also lost. Since the satellite set up data is updated whenever a change is made at the master, the satellites will always have the most recent data, assuming communications are not lost.

During operation the information on hits, thickness and length is stored in satellite memory and will continue for the full run unless some problem occurs. One such problem is a thickness of metal which is above or below the limits set by the operator. If a thickness is detected outside the limits, the "Thickness Fault" light 49 illuminates and the system automatically stops. The run light 48 goes out at this point. The production supervisor at this time must make a decision as to whether to remove the coil or change the thickness tolerance to override the processor until the end of the coil. If the decision is made to change the thickness tolerance, the key entry 53 is turned to the "Data Entry" position and the "HI" or "LO" button is depressed and the required tolerance change is entered and the key is then turned back to the "RUN" position. The length of material run at different thicknesses are accumulated in memory and become part of the final print-out.

With the detailed operational description of the system and the details of hardware provided above it is a simple matter for a person of ordinary skill in the art to assemble and program a system to function in the stated manner. Also, for a small installation, it is possible to combine the feature of a satellite and central processor into a single compact unit which can monitor and provide a print-out for a single press.

TABLE 1

END OF COIL PRESS # 10-12 TIME 20:01 DATE 02/07/80
PART # 14789 WIDTH 2310 REC # 12-112345 MILL WT 44963 CAL WT 44919 LO 2.56 HI 2.65
LENGTH 24103 SCRAP 1298 HITS 23451
THICKNESS 2.56 2.57 2.58 2.59 2.6 2.61 2.62 2.63 2.64 2.65
LENGTH 4112 815 2176 1616 866 2882 3136 2411 4598 1491

END OF COIL PRESS # 11-32 TIME 20:01 DATE 02/07/80
PART # 94371 WIDTH 1290 REC # 10-221451 MILL WT 68544 CAL WT 68523 LO 3.65 HI 3.78
LENGTH 40865 SCRAP 2195 HITS 21078
THICKNESS 3.65 3.66 3.67 3.68 3.69 3.7 3.71 3.72 3.73 3.74 3.75 3.76 3.77 3.78
LENGTH 4650 1521 4549 4798 835 4638 4446 3416 3840 2991 786 2369 257 1769

END OF COIL PRESS # 14-65 TIME 20:01 DATE 02/07/80
PART # 52171 WIDTH 2574 REC # 13-776451 MILL WT 30063 CAL WT 29983 LO 2.45 HI 2.61
LENGTH 43580 SCRAP 3189 HITS 20879
THICKNESS 2.45 2.46 2.47 2.48 2.49 2.5 2.51 2.52 2.53 2.54 2.55 2.56 2.57 2.58 2.59 2.6 2.61
LENGTH 1517 610 1697 3641 286 4058 215 3029 4817 418 3012 2999 4712 707 2910 4174 4778

I claim:

1. A device for automatically monitoring lengths of strip metal stock to a metal processing machine, comprising:
   (a) measuring means adapted to generate electrical signals proportional to the actual length of advancement of the stock,
   (b) measuring means adapted to generate electrical signals proportional to the actual thickness of the strip stock fed, and
   (c) computing means adapted to count electric pulses received from said length measuring means thereby measuring the length of feed stock actually fed, to convert electric pulses received from said thickness measuring means to measurements of the thickness of feedstock actually fed and also being adapted to store data based on the pre-determined width and density of the stock and determine the weight of stock fed as computed from the width and density data stored and the determined length and thickness of the actual stock fed.

2. A device according to claim 1 wherein the measuring means comprise a pair of wheels or rollers for engaging the strip metal stock therebetween, the wheels or rollers being mounted on articulated supports to move generally perpendicular to the direction of travel of the strip stock and being biased into engagement with the opposite faces of the strip stock.

3. A device according to claim 2 wherein one of the rollers has a transducer connected thereto to generate electrical signals proportional to the actual advancement of the strip stock.

4. A device according to claim 3 wherein a linear vertical differential transformer probe is connected between said articulated supports to generate electrical signals proportional to the distance between the rollers and thus the thickness of the strip stock passing between the rollers.

5. A device for automatically monitoring the thickness, length and weight of strip metal stock being fed from a roll feeder to a metal processing machine comprising:
   (a) a pair of rollers mounted on the feeder above and below the path of travel of the strip stock, said rollers being mounted on support arms which are pivotally mounted on the feeder to permit movement of the rollers in a substantially vertical direction and spring means mounted between said support arms to bias the rollers toward each other,
   (b) a rotary transducer operatively connected to an end of one of said rollers, said transducer being adapted to generate electrical signals proportional to the actual advancement of the strip stock,
   (c) a linear vertical differential transformer probe mounted between said support arms and adapted to generate electrical signals proportional to the distance between the rollers and thus the thickness of the strip stock passing between the rollers, and
   (d) a data processor adapted to count electric pulses from the rotary transducer and provide a reading of the actual length of strip stock fed by the feeder, to convert electric pulses received from the linear vertical differential transformer into readings of the actual thickness of the strip stock fed by the feeder, said processor being further adapted to store data based on the predetermined width and density of the strip stock and to calculate the actual weight of stock fed as computed from the width and density data stored and the actual length and thickness of the strip stock obtained from the rotary transducer and liner vertical differential transformer.

6. A device according to claim 5 wherein the data processor is operatively connected to a power press being fed by said feeder to receive electrical signals from said press indicative of hits by the press.

7. A device according to claim 6 wherein the data processor includes an alphanumeric display adapted to exhibit the number of hits by the press, the thickness of the strip stock passing between the rollers and the length of strip stock fed.

8. A device according to claim 7, which includes a printer adapted to print the calculated weight of a coil of strip stock fed through the device.

9. A device according to claim 8, wherein the printer is also adapted to print out the lengths of strip stock fed of different thicknesses.

10. A device according to claim 9 wherein the printer is adapted to print out the width of strip stock, mill weight of coil, calculated weight of coil fed, maximum and minimum thickness of strip stock fed, length of strip stock fed, length of scrap and number of hits from coil.

* * * * *